United States Patent
Nozawa et al.

(10) Patent No.: US 9,723,674 B2
(45) Date of Patent: Aug. 1, 2017

(54) CURRENT DRIVER, LED DRIVE CIRCUIT, LIGHTING DEVICE AND ELECTRONIC APPARATUS

(71) Applicant: ROHM CO., LTD., Ukyo-ku, Kyoto (JP)

(72) Inventors: Takeshi Nozawa, Kyoto (JP); Shingo Haruta, Kyoto (JP)

(73) Assignee: ROHM CO., LTD., Ukyo-Ku, Kyoto (JP)

( * ) Notice: Subject to any disclaimer, the term of this patent is extended or adjusted under 35 U.S.C. 154(b) by 0 days.

(21) Appl. No.: 15/210,297

(22) Filed: Jul. 14, 2016

(65) Prior Publication Data

US 2017/0027034 A1   Jan. 26, 2017

(30) Foreign Application Priority Data

Jul. 22, 2015  (JP) ................................. 2015-145205

(51) Int. Cl.
*H05B 33/08* (2006.01)
*G02F 1/1335* (2006.01)

(52) U.S. Cl.
CPC ... *H05B 33/0842* (2013.01); *G02F 1/133603* (2013.01); *H05B 33/0815* (2013.01); *H05B 33/0827* (2013.01)

(58) Field of Classification Search
CPC ............ H05B 33/0815; H05B 33/0845; H05B 33/0851; G09G 3/342
USPC ........................................................ 315/224
See application file for complete search history.

(56) References Cited

U.S. PATENT DOCUMENTS

| | | | | |
|---|---|---|---|---|
| 2012/0075544 A1* | 3/2012 | Sasaki | ............... | G02F 1/133603 349/42 |
| 2012/0133291 A1* | 5/2012 | Kitagawa | ........... | H05B 33/0812 315/186 |
| 2012/0188487 A1* | 7/2012 | Hagino | .............. | H05B 33/0812 349/69 |
| 2013/0038219 A1* | 2/2013 | Dau | ................... | H05B 33/0845 315/151 |
| 2013/0049622 A1* | 2/2013 | Angeles | ............. | H05B 33/0848 315/224 |

(Continued)

FOREIGN PATENT DOCUMENTS

JP         2009188135 A    8/2009
JP         2010015967 A    1/2010

*Primary Examiner* — Don Le
(74) *Attorney, Agent, or Firm* — Cantor Colburn LLP

(57) ABSTRACT

A current driver connected with light emitting diode (LED) bars of the maximum number N of channels and driving LED bars of M channels to be driven, includes: PWM input terminal configured to receive PWM-modulated external dimming pulse having duty cycle with a target light quantity common to the LED bars of the M channels; pulse measurement circuit configured to measure period and pulse width of the external dimming pulse and generate digital period data and pulse width data; interface circuit connected to external processor and configured to receive enable data and phase difference setting data; M current sources of the M channels to be driven and respectively connected with corresponding LED bars, and configured to be On-and-Off-switched in response to internal dimming pulse; and pulse generator configured to generate M internal dimming pulses and distribute the M internal dimming pulses to the M current sources.

12 Claims, 7 Drawing Sheets

(56) References Cited

U.S. PATENT DOCUMENTS

| | | | |
|---|---|---|---|
| 2013/0241441 A1* | 9/2013 | Myers | H05B 33/0833 315/307 |
| 2013/0250215 A1* | 9/2013 | Sasaki | H05B 33/0815 349/69 |
| 2014/0218657 A1* | 8/2014 | Haruta | G09G 3/342 349/61 |
| 2015/0189706 A1* | 7/2015 | Yang | H05B 33/083 315/224 |
| 2015/0382421 A1* | 12/2015 | Chowdhury | H05B 33/0815 315/201 |
| 2016/0323954 A1* | 11/2016 | Nozawa | H05B 33/086 |
| 2016/0360589 A1* | 12/2016 | Neudorf | H05B 33/086 |

* cited by examiner

FIG. 4A   CH1~CH6   G1
FIG. 4B   CH1, CH3, CH5   G1
          CH2, CH4, CH6   G2
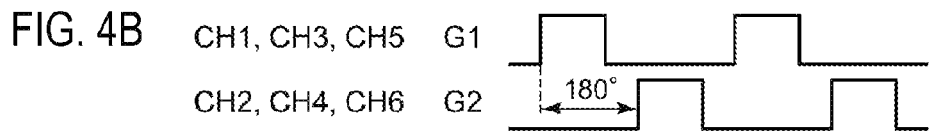
FIG. 4C   CH1, CH4   G1
          CH2, CH5   G2
          CH3, CH6   G3
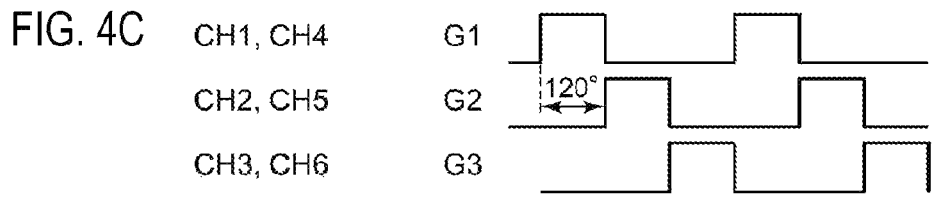
FIG. 4D   CH1, CH5   G1
          CH2, CH6   G2
          CH3       G3
          CH4       G4
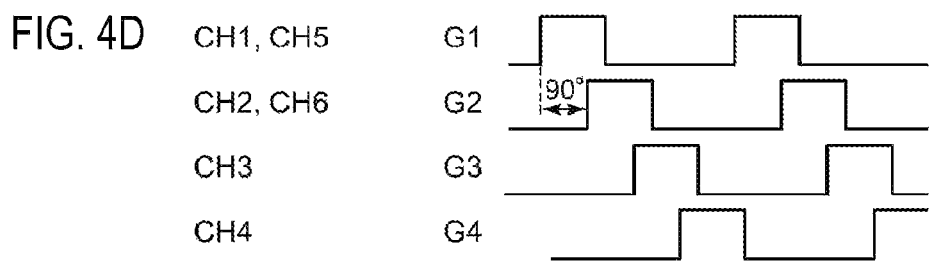
FIG. 4E   CH1, CH6   G1
          CH2        G2
          CH3        G3
          CH4        G4
          CH5        G5
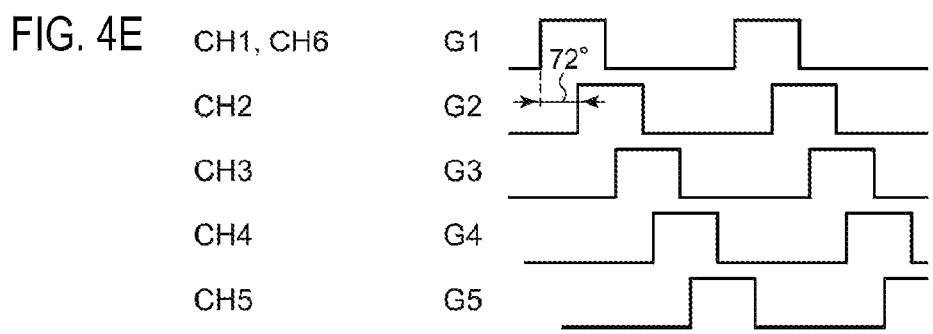
FIG. 4F   CH1   G1
          CH2   G2
          CH3   G3
          CH4   G4
          CH5   G5
          CH6   G6
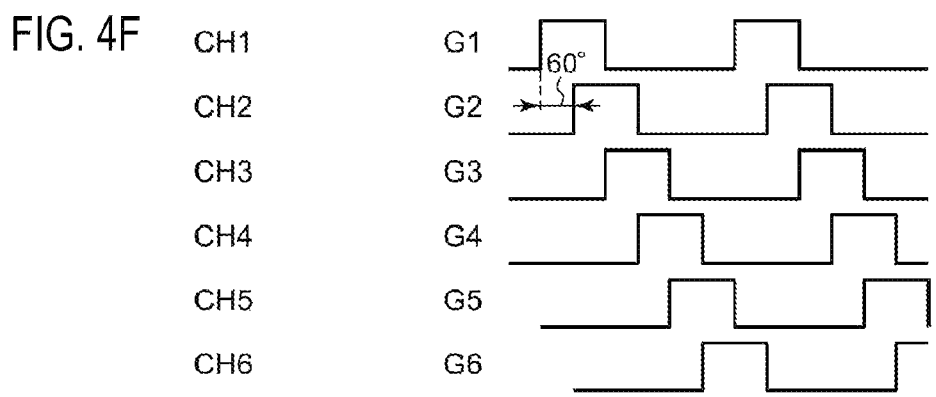

500a

500b

600

CURRENT DRIVER, LED DRIVE CIRCUIT, LIGHTING DEVICE AND ELECTRONIC APPARATUS

CROSS-REFERENCE TO RELATED APPLICATION(S)

This application is based upon and claims the benefit of priority from Japanese Patent Application No. 2015-145205, filed on Jul. 22, 2015, the entire contents of which are incorporated herein by reference.

TECHNICAL FIELD

The present disclosure relates to a light emitting diode drive circuit.

BACKGROUND

In recent years, light emitting diodes (LEDs) are being used for backlights of liquid crystal panels and lighting equipment. FIG. 1 is a circuit diagram illustrating the configuration of a typical light emitting device. A light emitting device 1003 includes a plurality of LED bars (also referred to as LED strings) 1006_1 to 1006_n, a switching converter 1004 and a current driver 1008.

Each of the LED bars 1006_1 to 1006_n includes a plurality of LEDs connected in series. The switching converter 1004 steps up an input voltage $V_{IN}$ and supplies a drive voltage $V_{OUT}$ to one end of each of the LED bars 1006_1 to 1006_n.

Each current driver 1008 includes current sources $CS_1$ to $CS_n$ provided for the respective LED bars 1006_1 to 1006_n. Each current source CS supplies a drive current $I_{LED}$ according to a target luminance to the corresponding LED bar 1006_1 to 1006_n.

The switching converter 1004 includes an output circuit 1102 and a control IC 1100. The output circuit 1102 includes an inductor L1, a switching transistor M1, a rectifier diode D1 and an output capacitor C1. The control IC 1100 adjusts the drive voltage $V_{OUT}$ by controlling a duty ratio of turning-on/off of the switching transistor M1.

In such a light emitting device 1003, in order to adjust the luminance of the LED bars 1006_1 to 1006_n, there are some cases where a light-on period $T_{ON}$ and a light-off period $T_{OFF}$ of the drive current $I_{LED}$ are controlled based on PWM (Pulse Width Modulation). Those cases are also referred to as a burst dimming, PWM dimming, or burst driving. Specifically, a dimming controller 1009 of the current driver 1008 receives pulse signals $PWM_1$ to $PWM_n$, each of which has a duty ratio according to a luminance, and controls switching of the current sources $CS_1$ to $CS_n$ respectively corresponding to the pulse signals $PWM_1$ to $PWM_n$.

In the burst dimming, if phases of drive currents $I_{LED1}$ to $I_{LEDn}$ of each channel are aligned, an output current Iout of the switching converter 1004 may be temporarily concentrated, which may become a factor of a ripple of an output voltage $V_{OUT}$ of the switching converter 1004 or an unexpected noise. This problem may be solved by inputting burst control signals $PWM_1$ to $PWM_n$ with phases shifted each other to the dimming controller 1009 and temporarily shifting the light-on period $T_{ON}$ of each channel.

However, in this method (referred to as phase shift burst dimming), it is necessary to generate burst control signals $PWM_1$ to $PWM_n$ by means of an external processor such as a digital signal processor (DSP) of the light emitting device 1003, which may lead to a great burden on liquid crystal TV designers. In addition, when the TV designers try to change the number of channels of LED bars, it is necessary for them to redesign a circuit to generate the burst control signals $PWM_1$ to $PWM_n$, which may result in increased costs for development. This problem may arise in other lighting devices, where it may be often required to change the number of LED bars, in addition to backlights of liquid crystal displays.

SUMMARY

The present disclosure provides a current driver which is capable of achieving phase shift burst dimming with ease in some embodiments.

According to one embodiment of the present disclosure, there is provided a current driver which is connected with light emitting diode (LED) bars of the maximum number N of channels (N is an integer of 2 or more) and drives LED bars of M channels (1≤M≤N) designated to be driven. The current driver includes: a PWM input terminal configured to receive an external dimming pulse subjected to pulse width modulation (PWM), the external dimming pulse having a duty cycle according to a target light quantity common to the LED bars of the M channels; a pulse measurement circuit configured to measure a period and pulse width of the external dimming pulse and generate digital period data and pulse width data; an interface circuit which is connected to an external processor and is configured to receive (i) enable data to designate LED bars of M channels to be driven and (ii) phase difference setting data to designate one of a plurality of selectable phase differences 360°/2, 360°/3, . . . , 360°/N; a plurality of M current sources which correspond to the M channels to be driven and are respectively connected with corresponding LED bars, and which are configured to be switched between On and Off in response to an internal dimming pulse; and a pulse generator configured to generate M internal dimming pulses having a period represented by the period data, a pulse width represented by the pulse width data, and a phase difference according to the phase difference setting data, and to distribute the generated M internal dimming pulses to the M current sources.

With this configuration, the external processor can generate a single PWM signal, thereby eliminating a need to generate M PWM signals. In addition, since the external processor generates enable data and phase difference setting data appropriate for each platform and applies them to the current driver, the current driver can drive LED bars of the desired number of channels at a desired phase difference, thereby achieving phase shift burst dimming.

In some embodiments, the enable data may designate use or non-use of each of the LED bars of the N channels.

In some embodiments, the current driver may further include an error amplifier configured to receive M detection voltages generated at connection nodes between the current sources and the LED bars of the M channels and generate a feedback signal by amplifying an error between the lowest detection voltage and a predetermined reference voltage. Drive voltages supplied to the LED bars may be feedback-controlled in response to the feedback signal.

In some embodiments, the current driver may further include a register holding the enable data and the phase difference setting data.

In some embodiments, the current driver may further include an analog dimming terminal configured to receive an analog dimming voltage. Each of the M current sources may generate a constant current in proportion to the analog dimming voltage.

In some embodiments, each of the M current sources may include: an output transistor and a sense resistor connected in series between the corresponding LED bar and a ground; and an operational amplifier having one input terminal to which an analog voltage is input, the other input terminal to which a voltage drop of the sense resistor is input, and an output terminal connected to a control terminal of the output transistor.

In some embodiments, the operational amplifier of each of the M current sources may be switched between On and Off in response to the corresponding internal dimming pulse.

In some embodiments, the current driver may further include: an analog dimming terminal configured to receive an analog dimming voltage; and a buffer configured to multiply the analog dimming voltage by a predetermined coefficient and supply the multiplied analog dimming voltage, as the analog voltage, to the operational amplifier of each of the M current sources.

In some embodiments, the current driver may be integrated on a single semiconductor substrate. As used herein, the term "integrated" is intended to include both of a case where all elements of a circuit are formed on a semiconductor substrate and a case where main elements of the circuit are integrated on the semiconductor substrate. In addition, some resistors, capacitors and the like for adjustment of a circuit constant may be provided outside the semiconductor substrate. By integrating the circuit into a single chip, it is possible to reduce a circuit area and keep characteristics of circuit elements constant.

According to another embodiment of the present disclosure, there is provided an LED drive circuit including: a switching converter; and the above-described current driver.

According to another embodiment of the present disclosure, there is provided a lighting device including: M (M is a natural number) LED (Light Emitting Diode) bars, each of which includes a plurality of LEDs connected in series; a rectifier circuit configured to smooth and rectify a commercial AC voltage into a DC voltage; a switching converter configured to receive the DC voltage smoothed and rectified in the rectifier circuit, as an input voltage, and supply a drive voltage to each of the M LED bars; and the above-described current driver.

According to still another embodiment of the present disclosure, there is provided an electronic apparatus including: a liquid crystal panel; and the above-described lighting device acting as a backlight irradiating the rear surface of the liquid crystal panel.

Further, any combination of the above-described elements or replacement expressions among a method, an apparatus and a system are also effective as embodiments of the present disclosure.

BRIEF DESCRIPTION OF THE DRAWINGS

FIGS. 4A to 4F are waveform diagrams illustrating a plurality of internal dimming pulses $S_{OUT}$ when k=1 to 6.

DETAILED DESCRIPTION

Figure 1:
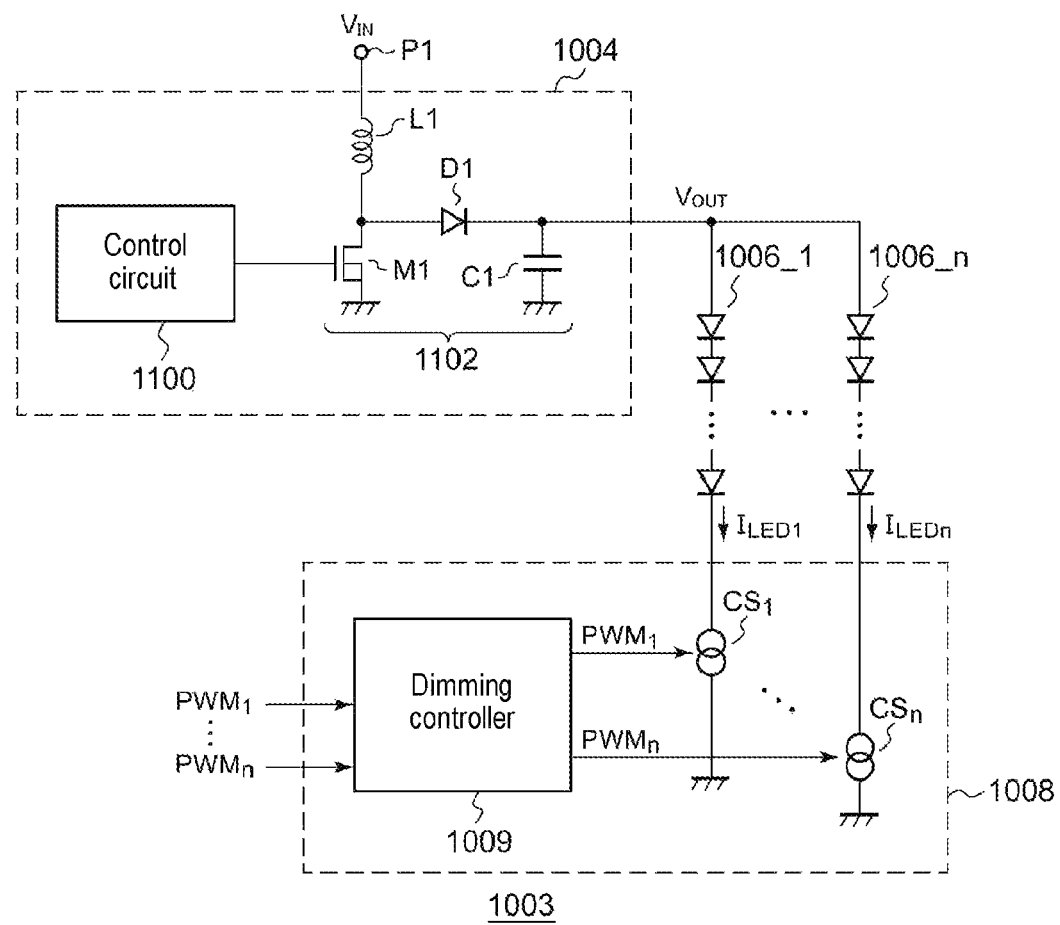
FIG. 1 is a circuit diagram illustrating the configuration of a typical light emitting device.

Preferred embodiments of the present disclosure will now be described in detail with reference to the drawings. Throughout the drawings, the same or similar elements, members and processes are denoted by the same reference numerals and explanation of which will not be repeated. The disclosed embodiments are provided for the purpose of illustration, not limitation, of the present disclosure and all features and combinations thereof described in the embodiments cannot be necessarily construed to describe the spirit of the present disclosure.

In the specification, the phrase "connection of a member A and a member B" is intended to include direct physical connection of the member A and the member B as well as indirect connection thereof via other member as long as the other member has no substantial effect on the electrical connection of the member A and the member B. Similarly, the phrase "interposition of a member C between a member A and a member B" is intended to include direct connection of the member A and the member C or direct connection of the member B and the member C as well as indirect connection thereof via other member as long as the other member has no substantial effect on the electrical connection of the member A, the member B and the member C.

Figure 2:
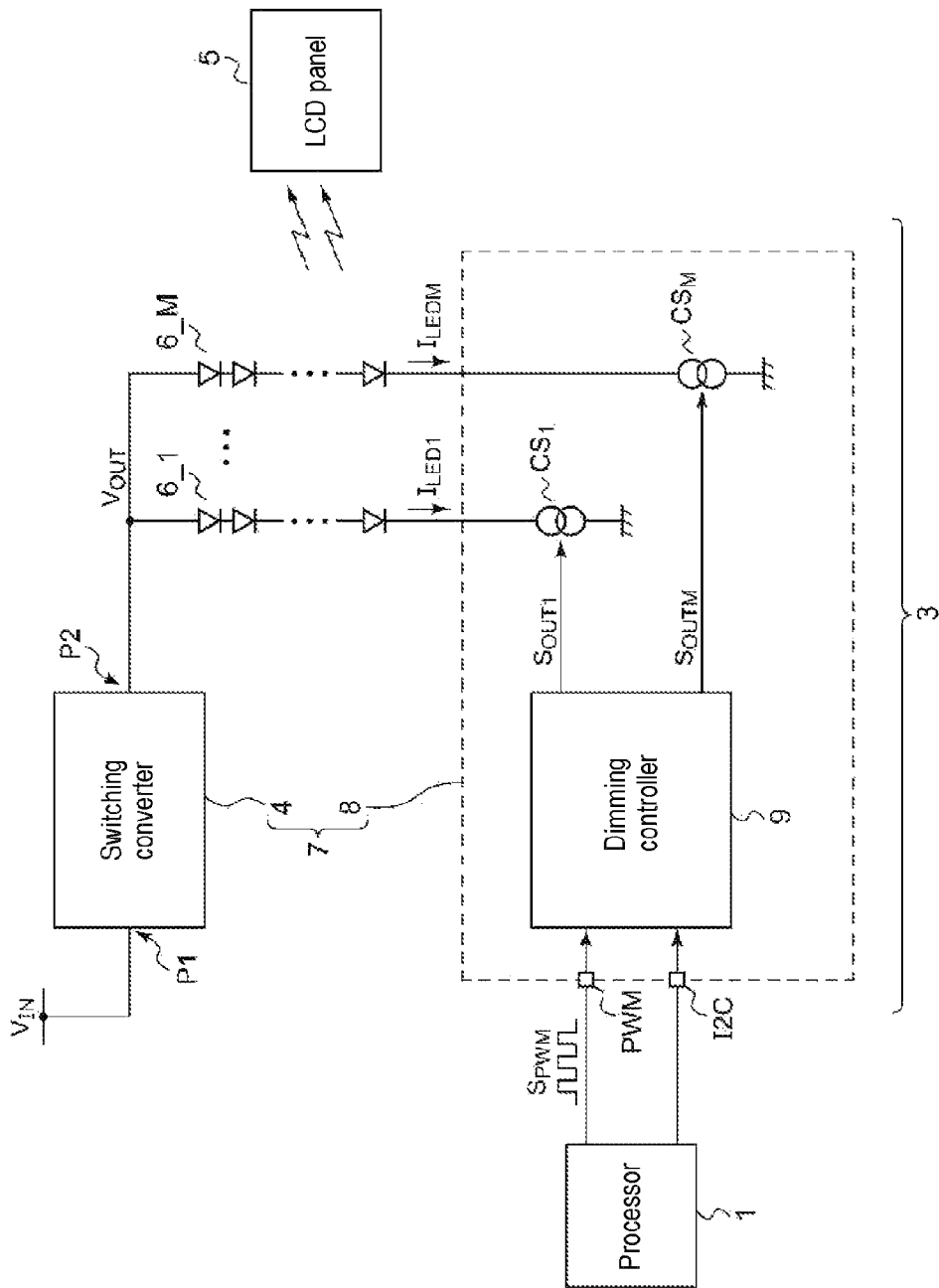
FIG. 2 is a circuit diagram illustrating the configuration of an electronic apparatus equipped with a lighting device.

FIG. 2 is a circuit diagram illustrating the configuration of an electronic apparatus equipped with a lighting device 3. An electronic apparatus 2 includes a lighting device 3 and an LCD (Liquid Crystal Display) panel 5. The lighting device 3 is provided as a backlight of the LCD panel 5.

The lighting device 3 includes LED bars 6_1 to 6_M (M is a natural number) of one channel or multi-channel CH1 to CHM, and an LED drive circuit 7. The LED drive circuit 7 includes a switching converter 4 and a current driver 8. The channel number M is N at maximum and is determined by a designer of the electronic apparatus 2 depending on two factors, i.e., the size of the LCD panel 5 and the type of the electronic apparatus 2. Specifically, N=4, 6, 8, 12, 16, . . . , and an effective channel number M may be selected within a range of 1≤M≤N.

Each LED bar 6 includes a plurality of LEDs connected in series. The switching converter 4 includes a DC/DC converter. The switching converter 4 has an input terminal P1 supplied with an DC input voltage $V_{IN}$ and an output terminal P2 to which the anodes of the LED bars 6_1 to 6_M of the M channels are connected in common. The switching converter 4 steps up (or steps down) the DC input voltage $V_{IN}$ of the input terminal P1 to generate a drive voltage $V_{OUT}$ in the output terminal P2. The switching converter 4 stabilizes the drive voltage $V_{OUT}$ to a voltage range in which the LED bars 6_1 to 6_M of the M channels to be driven can be properly lighted on.

LED bars 6 of the maximum number N of channels (N is an integer of 2 or more) can be connected to the current driver 8. The current driver 8 supplies drive currents $I_{LED1}$ to $I_{LEDM}$ according to a target luminance to LED bars of M channels (1≤M≤N) designated to be driven (that is an analog dimming) and further controls their respective luminance by switching the drive currents $I_{LED1}$ to $I_{LEDM}$ as necessary (that is a burst dimming or PWM dimming).

The current driver 8 is provided with a PWM input terminal (hereinafter abbreviated as a PWM terminal) and a serial interface terminal (I2C terminal). The PWM terminal is supplied with an external dimming pulse $S_{PWM}$ from a processor 1. The external dimming pulse $S_{PWM}$ is subjected to pulse width modulation (PWM) so as to have a duty cycle according to a target light quantity common to the LED bars 6_1 to 6_M of the M channels to be driven. The I2C terminal is connected to the processor 1 via an I2C (Inter IC) bus and the current driver 8 is configured according to the serial data from the processor 1.

The current driver 8 includes a dimming controller 9 and a plurality of current sources $CS_1$ to $CS_M$. The dimming controller 9 receives the external dimming pulse $S_{PWM}$ and the serial data from the processor 1 and generates internal dimming pulse signals $S_{OUT}$ corresponding to the M respective channels. The M current sources $CS_1$ to $CS_M$ correspond to the M respective channels to be driven. An $i^{th}$ (1≤i≤M) current source $CS_i$ is connected to its corresponding LED bar 6_i and is configured to be switched between On and Off in response to its corresponding internal dimming pulse signals $S_{OUTi}$. The current source $CS_i$ supplies a drive current $I_{LEDi}$ to the corresponding LED bar 6_i in an On state. The amount of the drive current $I_{LEDi}$ may be adjusted by the dimming controller 9.

Figure 3:
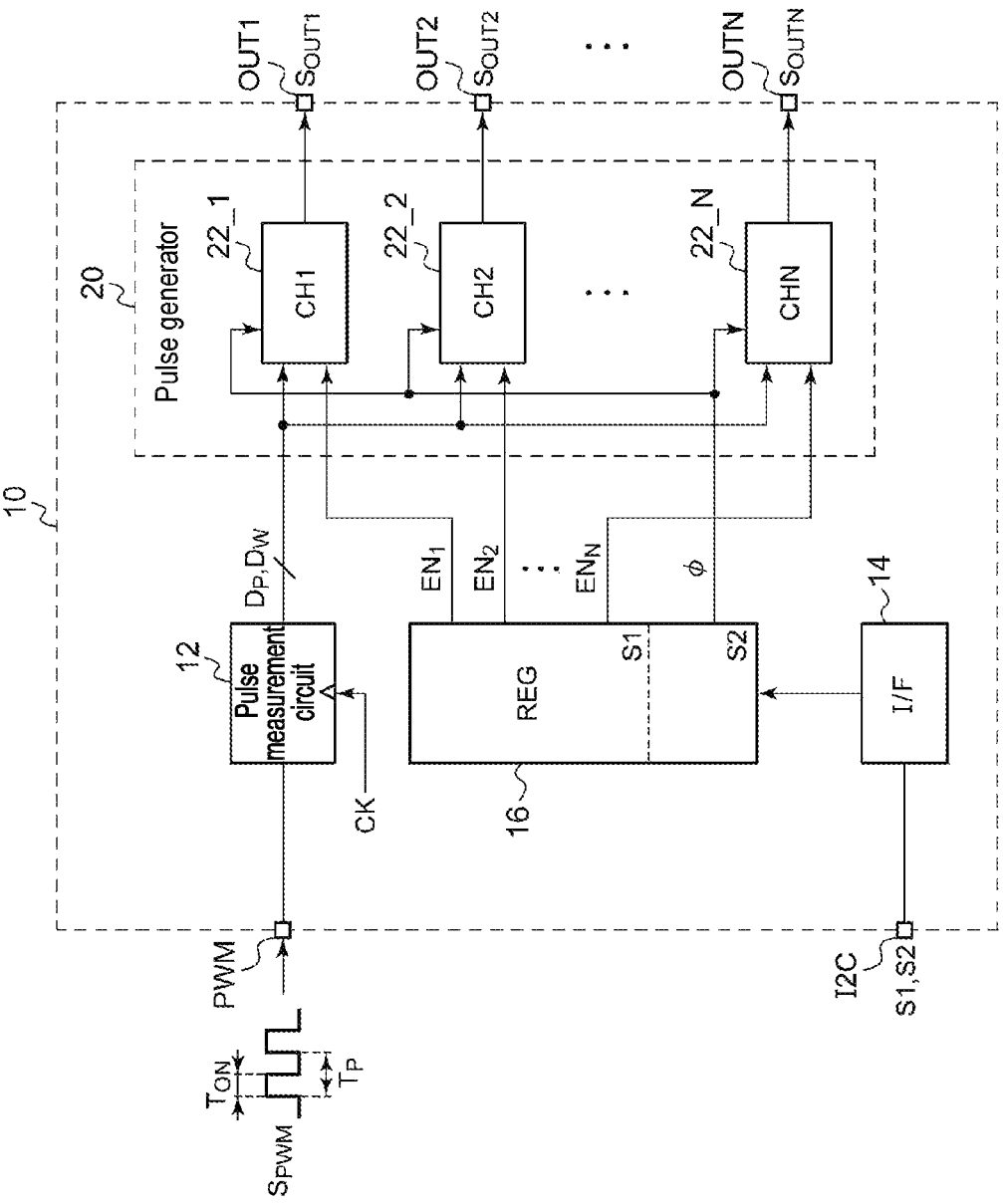
FIG. 3 is a block diagram of a burst dimming controller which is a part of a dimming controller.

The overall configuration of the lighting device 3 has been described above. Subsequently, the specific configuration of the dimming controller 9 according to some embodiments will be described in more detail. FIG. 3 is a block diagram of a burst dimming controller 10 which is a part of the dimming controller 9. The burst dimming controller 10 has output terminals OUT1 to OUTN of the N channels and M internal dimming pulses $S_{OUT}$ are output from M channels among the N channels. M current sources $CS_1$ to $CS_M$ are respectively associated with output terminals OUT of the M channels.

The burst dimming controller 10 includes a pulse measurement circuit 12, an interface circuit 14, a register 16 and a pulse generator 20. The pulse measurement circuit 12 measures the period $T_P$ and the pulse width $T_W$ of the external dimming pulse $S_{PWM}$ and generates digital period data $D_P$ and pulse width data $D_W$. For example, the pulse measurement circuit 12 may include a digital counter to use an internal clock signal CK having a frequency higher than that of the external dimming pulse $S_{PWM}$ to measure the period $T_P$ and the pulse width $T_W$.

The burst dimming controller 10 has the N output terminals OUT1 to OUTN and can control LED bars 6_1 to 6_N of the maximum number N of channels. The interface circuit 14 is connected with the external processor 1 via a serial bus. The interface circuit 14 receives (i) enable data S1 and (ii) phase difference setting data S2.

The enable data S1 is the data to designate LED bars of M channels to be driven, among the N channels. For example, the enable data S1 may be N-bit binary data to designate the use or non-use of each of the LED bars of the N channels. For example, the enable data S1 may include the most significant bit (MSB) $EN_1$ corresponding to the first channel CH1 and the least significant bit (LSB) $EN_N$ corresponding to the $N^{th}$ channel. In addition, values "1" and "0" may correspond to the use and the non-use, respectively.

The phase difference setting data S2 designates one (360°/k) of a plurality of selectable phase differences 360°/2, 360°/3, 360°/N (where, 2N). In addition to this, a phase difference 360°/1 (i.e., zero phase difference) may be selected.

For example, assuming that N=6, the number of selectable phase differences ϕ is 6 as follows. FIGS. 4A to 4F are waveform diagrams illustrating a plurality of internal dimming pulses $S_{OUT}$ for k=1 to 6. All the channels CH1 to CHN are divided into k groups G1 to Gk. Phase differences of channels in the same group are equal to each other and a phase difference between groups is set to 360°/k.

k=1 and ϕ=360° (=0°)
As illustrated in FIG. 4A, all the channels CH1 to CH6 belong to the same group G1 and have the same phase.

k=2 and ϕ=180°
As illustrated in FIG. 4B, three channels CH1, CH3 and CH5 are classified into the first group G1 and the remaining channels CH2, CH4 and CH6 are classified into the second group G2. A phase difference between the two groups G1 and G2 is 180°.

k=3 and ϕ=120°
As illustrated in FIG. 4C, two channels CH1 and CH4 are classified into the first group G1, other two channels CH2 and CH5 are classified into the second group G2, and the remaining two channels CH3 and CH6 are classified into the third group G3. A phase difference between the three groups G1 to G3 is 120°.

k=4 and ϕ=90°
As illustrated in FIG. 4D, four channels CH1 to CH4 are classified into the first to fourth groups G1 to G4, respectively, and the remaining channels CH5 and CH6 are classified into the first and second groups G1 and G2, respectively. A phase difference between the four groups G1 to G4 is 90°.

k=5 and ϕ=72°
As illustrated in FIG. 4E, five channels CH1 to CH5 are classified into the first to fifth groups G1 to G5, respectively, and the remaining channel CH6 is classified into the first group G1. A phase difference between the five groups G1 to G5 is 72°.

k=6 and ϕ=60°
As illustrated in FIG. 4F, six channels CH1 to CH6 are classified into the first to sixth groups G1 to G6, respectively. A phase difference between the six groups G1 to G6 is 60°.

Returning to FIG. 3, the enable data S1 and the phase difference setting data S2 received by the interface circuit 14 are stored in the register 16. The register 16 is referred to by the pulse generator 20.

The pulse generator 20 generates the M internal dimming pulses $S_{OUT}$ having the period $T_P$ represented by the period data $D_P$ and the pulse width $T_W$ represented by the pulse width data $D_W$ and having a phase difference ϕ according to the phase difference setting data S2 and distributes them to the M current sources $CS_1$ to $CS_M$, respectively. It is noted that an $i^{th}$ current source $CS_i$ is not necessarily connected with an $i^{th}$ output terminal OUTi under the condition of M<N. For example, for M=2, when the third channel CH3 and the fourth channel CH4 are designated as use channels, the current source $CS_1$ is connected to the output terminal OUT3 and the current source $CS_2$ is connected to the output terminal OUT4.

The pulse generator 20 may contain counters 22_1 to 22_N corresponding to the N channels. An $i^{th}$ counter 22 generates an internal dimming pulse $S_{OUT}$ having the period $T_P$ and the pulse width $T_W$ at a phase difference ϕ according to the phase difference setting data S2 when a corresponding bit ENi of the enable data is "1." Each of the counters 22_1 to 22_N is a digital counter for counting an internal clock signal CK and generates the internal dimming pulse $S_{OUT}$ which is transitioned between a high level and a low level at a timing based on $D_P$, $D_W$ and ϕ.

Figure 5:
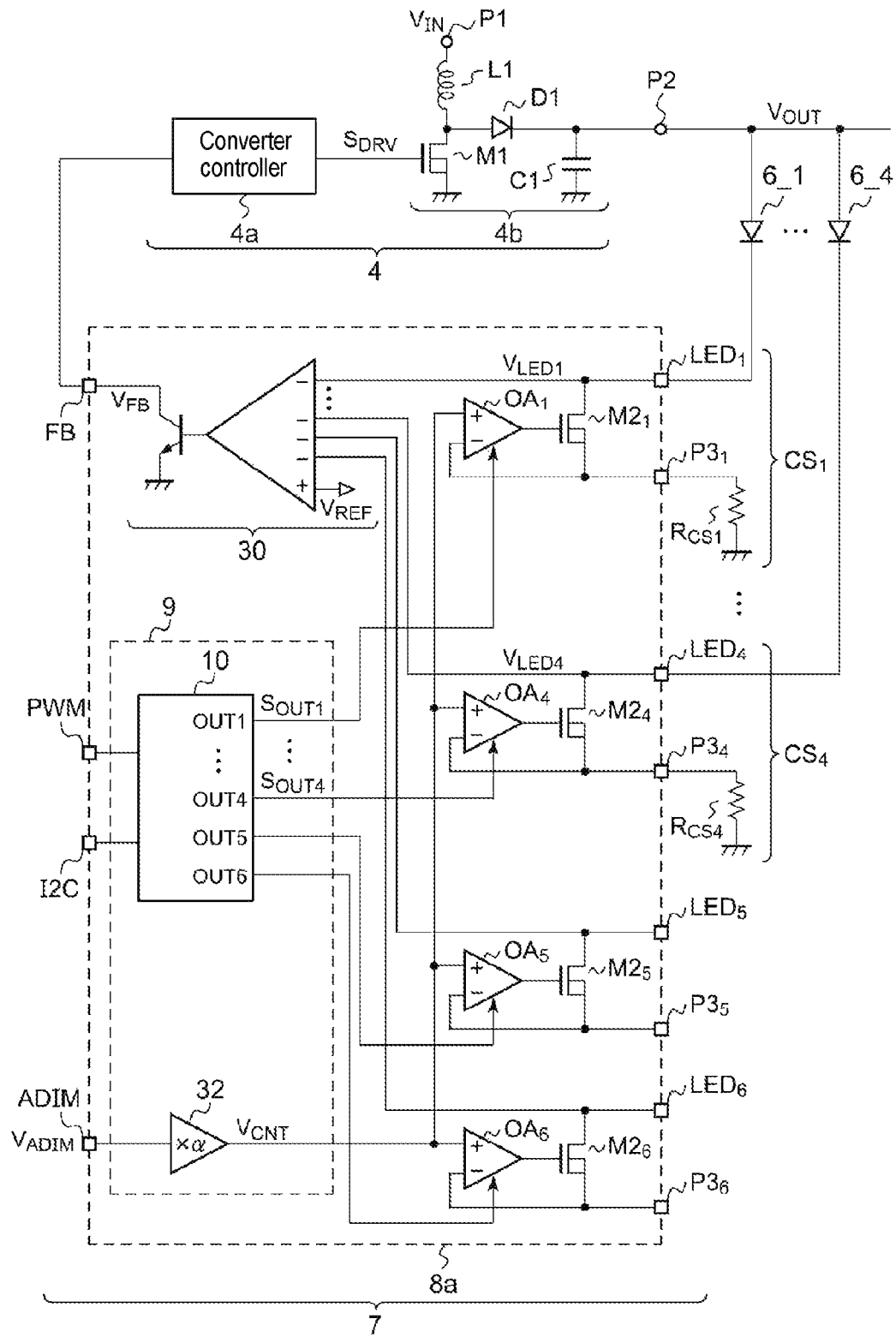
FIG. 5 is a circuit diagram illustrating the configuration of an LED drive circuit.

FIG. 5 is a circuit diagram illustrating the configuration of the LED drive circuit 7. For example, the switching converter 4 includes an output circuit 4b and a controller 4a thereof. The output circuit 4b is configured to have a topology of a boost converter including an inductor L1, a switching transistor M1, a diode D1 and an output capacitor C1.

A current driver IC 8a corresponds to the current driver 8 of FIG. 2 and is a functional IC (Integrated Circuit) integrated on a single semiconductor substrate. The current driver IC 8a has an analog dimming terminal ADIM, a feedback terminal FB, N LED terminals $LED_1$ to $LED_N$ and N current detection terminals $P3_1$ to $P3_N$, in addition to the PWM terminal and the I2C terminal. For the purpose of easy understanding and brevity of description, N is set to 6 in FIG. 5.

When an $i^{th}$ channel is to be used, an LED bar 6_i is connected to an $LED_i$ terminal and an external sense resistor $R_{CSi}$ is connected to a current detection terminals $P3_i$. FIG. 5 shows an application where M (=4) channels including the first to fourth channels CH1 to CH4 are used.

In addition, the current driver IC 8a includes a dimming controller 9, an error amplifier 30, N output transistors $M2_1$ to $M2_N$ and N operational amplifiers $OA_1$ to $OA_N$. For an $i^{th}$ channel (1≤i≤N), an output transistor $M2_i$ is interposed between the $LED_i$ terminal and a $P3_i$ terminal. An operational amplifier $OA_i$ has one (non-inverted) input terminal to which an analog voltage $V_{CNT}$ is input and the other (inverted) input terminal connected to the current detection terminal $P3_i$. In addition, the operational amplifier $OA_i$ has an output terminal connected to a control terminal (gate) of an output transistor $M2_i$. When the $i^{th}$ channel is to be used, the sense resistor $R_{CSi}$ is connected to the $P3_i$ terminal and a voltage drop of the sense resistor $R_{CSi}$ is input to the inverted input terminal of the operational amplifier $OA_i$.

For a channel to which a sense resistor $R_{CS}$ is connected, an output transistor M2, an operational amplifier OA and the sense resistor $R_{CS}$ form a current source CS. No current source CS is formed for a channel to which no sense resistor $R_{CS}$ is connected.

A current source $CS_i$ formed for an $i^{th}$ channel is controlled to be switched between On and Off in response to an internal dimming pulse $S_{OUT}$ from an $i^{th}$ output terminal OUTi of the burst dimming controller 10. When the operational amplifier $OA_i$ included in the current source $CS_i$ is configured to be turned on/off in response to an internal dimming pulse $S_{OUTi}$ from the OUTi terminal, the current source $CS_i$ can be turned on/off. The operational amplifier $OA_i$ may be switched between On and Off depending on On/Off of a bias current for a differential input stage, an amplification stage and an output stage of the operational amplifier $OA_i$.

The configuration of switching the current source between On and Off is not particularly limited. For example, an additional switch may be interposed between the gate of the output transistor M2 and a ground and may be switched in response to the internal dimming pulse $S_{OUTi}$ from the OUTi terminal.

The current driver IC 8a is provided with the analog dimming terminal ADIM to which an analog dimming voltage $V_{ADIM}$ is externally input. The current sources $CS_1$ to $CS_M$ generate constant currents $I_{LED1}$ to $I_{LEDM}$ in proportion to the analog dimming voltage $V_{ADIM}$. For example, the dimming controller 9 includes a buffer 32 in addition to the burst dimming controller 10. The buffer 32 generates the analog voltage $V_{CNT}$ by multiplying the analog dimming voltage $V_{ADIM}$ by a predetermined coefficient. A drive current $I_{LEDi}$ generated for each channel is expressed by the following equation.

$$I_{LEDi}=V_{CNT}/R_{CSi}=V_{ADIM}\times\alpha/R_{CSi}$$

The error amplifier 30 has N inverted input terminals connected respectively to the N LED terminals $LED_1$ to $LED_N$ and a non-inverted input terminal to which a predetermined reference voltage $V_{REF}$ is input. The error amplifier 30 amplifies an error between the lowest one of voltages of the N inverted input terminals and the reference voltage $V_{REF}$ of the non-inverted input terminal. Here, an LED terminal of an unused channel is pulled-up by a circuit (not shown) in order to exclude the LED terminal from targets of a feedback control. As a result, the error amplifier 30 receives M detection voltages $V_{LED1}$ to $V_{LEDM}$ generated respectively in the M LED terminals $LED_1$ to $LED_M$ and generates a feedback signal $V_{FB}$ by amplifying an error between the lowest detection voltage $V_{LEDX}$ and the predetermined reference voltage $V_{REF}$. For example, the error amplifier 30 has an output stage of an open-collector type (or open-drain type) and its feedback signal $V_{FB}$ is input to the controller 4a via the feedback terminal FB. The controller 4a generates a drive pulse $S_{DRV}$ having a duty ratio which is dependent on the feedback signal $V_{FB}$ and drives the switching transistor M1 based on the drive pulse $S_{DRV}$. Thus, in response to the feedback signal $V_{FB}$, the drive voltages $V_{OUT}$ supplied to the LED bars 6 are feedback-controlled in such a manner that the detection voltage $V_{LEDX}$ approaches the reference voltage $V_{REF}$.

The configuration example of the LED drive circuit 7 has been described above. Subsequently, the operation thereof will be described. In the platform of FIG. 5, when the current driver IC 8a is completed to be driven, the enable data S1 designating the channels CH1 to CH4 as "use" and the channels CH5 and CH6 as "non-use" is supplied from the processor 1. As one example, the phase difference setting data S2 designating φ=90° is input.

Thereafter, when the set-up of the current driver IC 8a is completed, an external dimming pulse $S_{PWM}$ is input to the current driver IC 8a. The burst dimming controller 10 generates the four internal dimming pulses $S_{OUT1}$ to $S_{OUT4}$ illustrated in FIG. 4D and supplies them to the current sources $CS_1$ to $CS_4$ of the first to fourth channels CH1 to CH4, respectively. This allows the LED bars 6_1 to 6_4 to be turned on with a phase difference of 90° between them at a duty ratio of the external dimming pulse $S_{PWM}$. By increasing/decreasing the duty ratio of the external dimming pulse $S_{PWM}$ by means of the processor 1, it is possible to change the amount of light of the LED bars 6_1 to 6_N.

The operation of the LED drive circuit 7 has been described above. The LED drive circuit 7 may be used to allow the external processor 1 to generate a single PWM signal even in a platform using M LED bars, thereby eliminating a need to generate M PWM signals. This can result in reduction of a burden on the processing of the processor 1. In addition, since there is no need to provide the current driver 8 with pins for receiving the M PWM signals, the circuit area can be reduced.

In addition, since the processor 1 generates enable data S1 and phase difference setting data S2 appropriate for each platform and applies them to the current driver 8, the current driver 8 can drive LED bars of the desired number of channels at a desired phase difference, thereby achieving phase shift burst dimming A backlight of liquid crystal panel includes the number of LED bars selected depending on the size of a panel. According to some embodiments, it is possible to use the LED drive circuit 7 for liquid crystal panels different in size without changing the basic configuration of the LED drive circuit 7.

(Applications)

Figure 6:
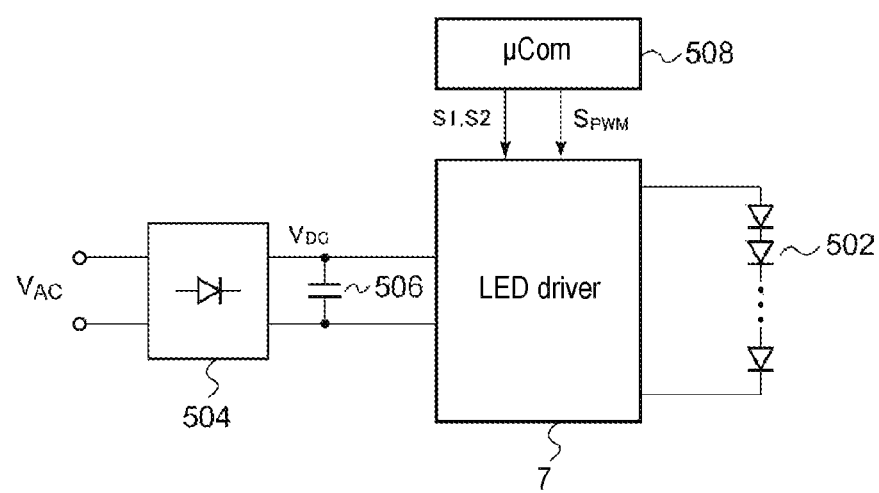
FIG. 6 is a block diagram of a lighting device including the LED drive circuit.

Finally, applications of the LED drive circuit 7 will be described. FIG. 6 is a block diagram of a lighting device 500 including the LED drive circuit 7. The lighting device 500 includes a light emitting part acting as an LED light source 502, a rectifier circuit 504, a smoothing capacitor 506 and a microcomputer 508 in addition to the LED drive circuit 7. The LED light source 502 includes one or more LED bars. The rectifier circuit 504 and the smoothing capacitor 506 convert a commercial AC voltage $V_{AC}$ into a DC voltage $V_{DC}$ through a rectifying/smoothing operation. The microcomputer 508 generates an external dimming pulse $S_{PWM}$, the enable data S1 and the phase difference setting data S2 in order to instruct the LED light source 502 to show its intended luminance. The LED drive circuit 7 receives the DC voltage $V_{DC}$ as an input voltage $V_{IN}$ and supplies the input voltage $V_N$ to the LED light source 502.

Figure 7A:
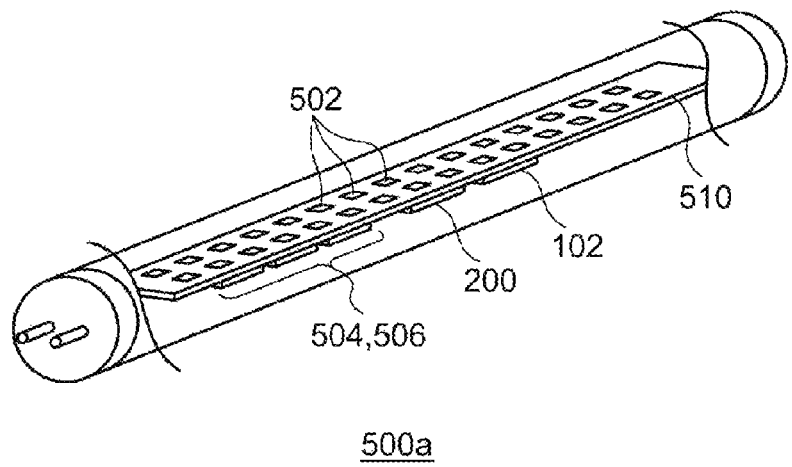
FIGS. 7A to 7C are views showing specific examples of the lighting device.
Figure 7B:
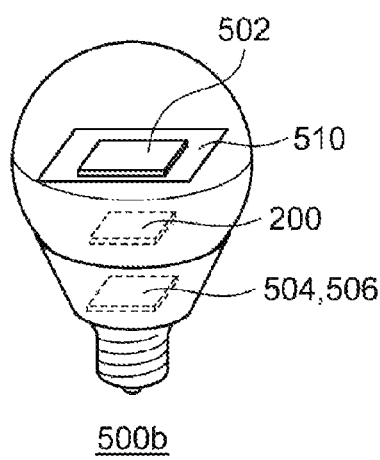
Figure 7C:
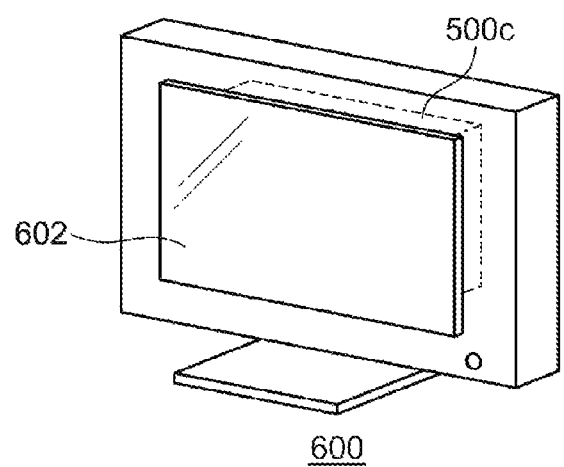

FIGS. 7A to 7C are views showing specific examples of the lighting device 500. In FIGS. 7A to 7C, all the elements are not shown but some of them are omitted. A lighting device 500a of FIG. 7A is a tubular LED lighting device. A plurality of LED elements forming an LED string acting as the LED light source 502 is arranged on a substrate 510. A rectifier circuit 504, a control circuit 200, an output circuit 102 of a constant current converter, etc., are mounted on the substrate 510. The output circuit 102 includes an inductor L1, a switching transistor M1, a rectifier diode D1, a smoothing capacitor C1, and so on.

A lighting device 500b of FIG. 7B is a bulb-type LED lighting device. An LED module acting as the LED light source 502 is mounted on a substrate 510. A control circuit 200 and a rectifier circuit 504 are mounted within a housing of the lighting device 500b.

A lighting device 500c of FIG. 7C is a backlight incorporated in a liquid crystal display 600. The lighting device 500c irradiates the rear surface of a liquid crystal panel 602 with light.

Alternatively, the lighting device 500 may also be used for ceiling lights. In this way, the lighting device 500 of FIG. 6 is useful for a variety of applications.

The present disclosure has been described above by way of embodiments. The disclosed embodiments are illustrated only. It should be understood by those skilled in the art that various modifications to combinations of elements or processes may be made and such modifications fall within the scope of the present disclosure. Such modifications will be described below.

Although a non-insulated switching converter including an inverter has been described in the above embodiments, the present disclosure can also be applied to an insulated switching converter including a transformer, such as a flyback converter or a forward converter. Alternatively, the switching converter may be a step-down converter.

The output transistor M2 of the current driver IC 8a shown in FIG. 5 may be an external component. In addition, the current driver IC 8a and the controller 4a may be integrated on the same semiconductor substrate or may be modularized into a single package.

In addition, in the above embodiments, logic signals of high level and low level are set in an illustrative manner and may be freely changed to be appropriately inverted by means of an inverter or the like.

According to some embodiments of the present disclosure, it is possible to provide a current driver which is capable of achieving phase shift burst dimming with ease.

While certain embodiments have been described, these embodiments have been presented by way of example only, and are not intended to limit the scope of the disclosures. Indeed, the novel methods and apparatuses described herein may be embodied in a variety of other forms; furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A current driver which is connected with light emitting diode (LED) bars of the maximum number N of channels (N is an integer of 2 or more) and drives LED bars of M channels (1≤M≤N) designated to be driven, comprising:
    a PWM input terminal configured to receive an external dimming pulse subjected to pulse width modulation (PWM), the external dimming pulse having a duty cycle according to a target light quantity common to the LED bars of the M channels;
    a pulse measurement circuit configured to measure a period and a pulse width of the external dimming pulse and generate a digital period data and a pulse width data;
    an interface circuit which is connected to an external processor and is configured to receive (i) an enable data to designate the LED bars of M channels to be driven and (ii) a phase difference setting data to designate one of a plurality of selectable phase differences 360°/2, 360°/3, . . . , 360°/N;
    a plurality of M current sources which correspond to the M channels to be driven and are respectively connected with corresponding LED bars, and which are configured to be switched between On and Off in response to an internal dimming pulse; and
    a pulse generator configured to generate M internal dimming pulses having a period represented by the period data, a pulse width represented by the pulse width data, and a phase difference according to the phase difference setting data, and to distribute the generated M internal dimming pulses to the M current sources.

2. The current driver of claim 1, wherein the enable data designates a use or a non-use of each of the LED bars of the N channels.

3. The current driver of claim 1, further comprising an error amplifier configured to receive M detection voltages generated at connection nodes between the current sources and the LED bars of the M channels and generate a feedback signal by amplifying an error between the lowest detection voltage and a predetermined reference voltage,
    wherein drive voltages supplied to the LED bars are feedback-controlled in response to the feedback signal.

4. The current driver of claim 1, further comprising a register holding the enable data and the phase difference setting data.

5. The current driver of claim 1, wherein each of the M current sources includes:
    an output transistor and a sense resistor connected in series between the corresponding LED bar and a ground; and
    an operational amplifier having one input terminal to which an analog voltage is input, the other input terminal to which a voltage drop of the sense resistor is input, and an output terminal connected to a control terminal of the output transistor.

6. The current driver of claim 5, wherein the operational amplifier of each of the M current sources is switched between On and Off in response to the corresponding internal dimming pulse.

7. The current driver of claim 1, further comprising an analog dimming terminal configured to receive an analog dimming voltage,
   wherein each of the M current sources generates a constant current in proportion to the analog dimming voltage.

8. The current driver of claim 5, further comprising:
   an analog dimming terminal configured to receive an analog dimming voltage; and
   a buffer configured to multiply the analog dimming voltage by a predetermined coefficient and supply the multiplied analog dimming voltage, as the analog voltage, to the operational amplifier of each of the M current sources.

9. The current driver of claim 1, wherein the current driver is integrated on a single semiconductor substrate.

10. An LED drive circuit comprising:
    a switching converter; and
    the current driver of claim 1.

11. A lighting device comprising:
    M (M is a natural number) LED (Light Emitting Diode) bars, each of which includes a plurality of LEDs connected in series;
    a rectifier circuit configured to smooth and rectify a commercial AC voltage into a DC voltage;
    a switching converter configured to receive the DC voltage smoothed and rectified in the rectifier circuit, as an input voltage, and supply a drive voltage to each of the M LED bars; and
    the current driver of claim 1.

12. An electronic apparatus comprising:
    a liquid crystal panel; and
    the lighting device of claim 11, which acts as a backlight irradiating the liquid crystal panel with light from the rear surface of the liquid crystal panel.

* * * * *